United States Patent [19]

Madler

[11] Patent Number: 5,547,207

[45] Date of Patent: Aug. 20, 1996

[54] ROUGH TERRAIN VEHICLE

[76] Inventor: Herman J. Madler, 108 S. George St., Mt. Prospect, Ill. 60056

[21] Appl. No.: 513,068

[22] Filed: Aug. 9, 1995

[51] Int. Cl.$^6$ ............................................. B60G 21/02
[52] U.S. Cl. ........................................ 280/104; 180/24.08
[58] Field of Search ......................... 280/104; 180/24.08

[56] References Cited

U.S. PATENT DOCUMENTS

| | | | |
|---|---|---|---|
| 3,313,555 | 4/1967 | Reimer | 280/104 |
| 3,506,079 | 4/1970 | Madler et al. | 180/24.08 |
| 3,525,534 | 8/1970 | Madler et al. | 280/104 |
| 3,917,306 | 11/1975 | Madler et al. | 280/104 |
| 4,186,815 | 2/1980 | Hart | 180/24.08 |
| 4,941,539 | 7/1990 | Kopczynski | 180/24.08 |

*Primary Examiner*—Kenneth R. Rice
*Attorney, Agent, or Firm*—Tilton, Fallon, Lungmus, Chestnut

[57] ABSTRACT

A rough terrain vehicle having a vehicle frame which maintains the vehicle platform and body in a relatively level position even when traversing slanted or uneven terrain is disclosed. The vehicle frame includes first and second forwardly-extending frame arms, and third and fourth rearwardly-extending frame arms. A central axle connects the frame arms at a midpoint of the vehicle and permits relative movement of the frame arms about pivot points at each side of the vehicle. Length-adjustable connecting members are provided at each side of the vehicle for controlling relative movement of the frame arms about the pivot points. A control mechanism is operatively associated with the connecting members for adjusting the relative positions of the frame arms so that the central axle remains relatively level even as the wheels follow the contour of slanted or uneven terrain. The vehicle platform and body are supported by the central axle so the vehicle body which carries the driver also remains level as the vehicle travels over the ground surface.

28 Claims, 4 Drawing Sheets

5,547,207

ROUGH TERRAIN VEHICLE

BACKGROUND AND SUMMARY

This invention relates to rough terrain vehicles, and more particularly, to a frame for a rough terrain vehicle which supports and maintains the vehicle platform and body in a relatively level position even when the vehicle is traveling along a slanted grade or uneven terrain.

Many vehicles have been designed to operate off of improved roadways or highways and over uneven or rough terrain. Examples of such off-the-road or all-terrain vehicles can be found in my co-invented prior U.S. Pat. Nos. 3,917, 306, 3,506,079 and 3,525,534. This invention is an improvement over the prior constructions and is particularly directed to a vehicle for traveling along slanted grades such as commonly found in drainage culverts along highways or the like. Such vehicles are commonly used to mow the grass along roadways. Other applications of the rough terrain vehicle of this invention may include fork lifts or ditching machines which have elongate digging blades entrenched on the ground that are prone to break if the ditching machine is unlevel. It will also be understood that this invention is applicable to any type of vehicle for traversing rough, uneven or slanted terrain.

Vehicles for traveling in drainage culverts and the like typically take the form of conventional tractors which have a rigid one-piece frame and a fixed wheelbase. When such a vehicle travels along a slanted grade, the wheels on one side of the vehicle are lower than the wheels on the other side of the vehicle, and the vehicle body necessarily adopts a tilted orientation roughly equal to the slanted grade of the ground. The tilted orientation of the vehicle body can be quite uncomfortable for the driver, particularly when the grade is steep. Irregularities or bumps on the slanted grade can also cause one or more of the wheels to lift off the ground, which impacts the driver's ability to control the vehicle. There is also always the danger of the vehicle rolling over.

In addition, the slanted orientation of the vehicle transmits torsional stresses to the frame which causes strain and damage to the vehicle body. The tilted orientation of the vehicle body also shifts the center of gravity of the vehicle over the wheels and reduces the amount of traction between one or more of the wheels and the ground. When one of the wheels encounters a bump on the ground surface, additional torsional forces are applied to the frame which can further tilt and cause vibration in the vehicle frame. Obviously, the accumulation of the slanted orientation of the vehicle body, the loss of traction of the wheels, and the torsional stresses and vibrations produced in the vehicle body provide less than a comfortable ride which often causes the driver physical fatigue.

An important aspect of this invention therefore lies in providing a vehicle frame for a rough terrain vehicle which maintains the vehicle platform and body at a relatively level orientation even when the vehicle is traveling along a slanted grade or uneven terrain. Such results are achieved by providing a vehicle frame which includes four independently movable frame arms which each have a wheel mounted thereon. Pivot means connect the frame arms at approximately the midpoint of the vehicle and permit relative independent movement of each of the frame arms about the pivot means. Connecting means and control means are associated with the frame arms on each side of the vehicle for controlling relative movement of the frame arms.

When the wheels on one side of the vehicle fall out of level with the wheels on the other side of the vehicle, the connecting and control means are operable to adjust the relative positions of the frame arms on each side of the vehicle so that a central axle at a midpoint of the vehicle remains relatively level. The vehicle platform and body are supported on the central axle so that the vehicle platform and body also remain relatively level even when the vehicle travels along a slanted grade. The connecting and control means are also operable to maintain the vehicle body in a relatively level position when only one of the wheels encounters a bump or irregularity on the ground surface.

Other features, advantages, and objects of the invention will become apparent from the specification and drawings.

DETAILED DESCRIPTION OF THE PREFERRED EMBODIMENT

Figure 4:
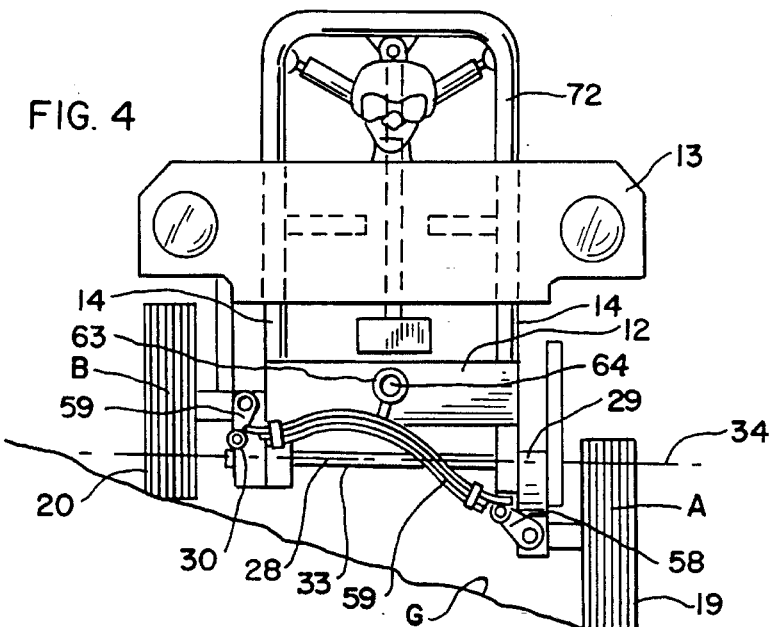
FIG. 4 is a front elevational view of the vehicle travelling along a slanted grade.

Referring to the drawings, the numeral 10 generally designates a rough terrain vehicle having a vehicle frame 11, a vehicle platform 12 having a front half 12a, a back half 12b and a pivotal connection 12c, and a vehicle body 13 (see FIG. 4). The vehicle body 13 is supported on a platform 12 by brackets 14 or other suitable connecting means. The vehicle body 13 and the means for connecting it to the platform 12 may take the form of any conventional design.

The frame 11 includes first and second forwardly-extending spaced-apart frame arms 15 and 16 and third and fourth rearwardly-extending spaced-apart frame arms 17 and 18. Frame arms 15 and 16 include proximal ends 15a and 16a and distal ends 15b and 16b, and frame arms 17 and 18 include proximal ends 17a and 18a and distal ends 17b and 18b. Each of the distal ends of the frame arms 15–18 is respectively provided with a wheel 19, 20, 21 or 22 which is rotatably mounted thereon.

Wheels 19–22 may be connected to the distal ends of the frame arms 15–18 by any suitable wheel mounting means. In the embodiment shown in the drawings, the wheel mounts take the form of a bracket 23 attached to the frame arm, a bracket 24 and an axle 25 which rotatably supports the wheel, and a pivot pin 26 which connects the brackets 23 and 24. A conventional steering mechanism partially shown at 27 is connected to bracket 24 for steering the wheel. While the wheels of the vehicle shown in the drawings are individually steerable, it will be understood that the wheels may instead be supported by stub axles (not shown) or any other conventional means.

Figure 3:
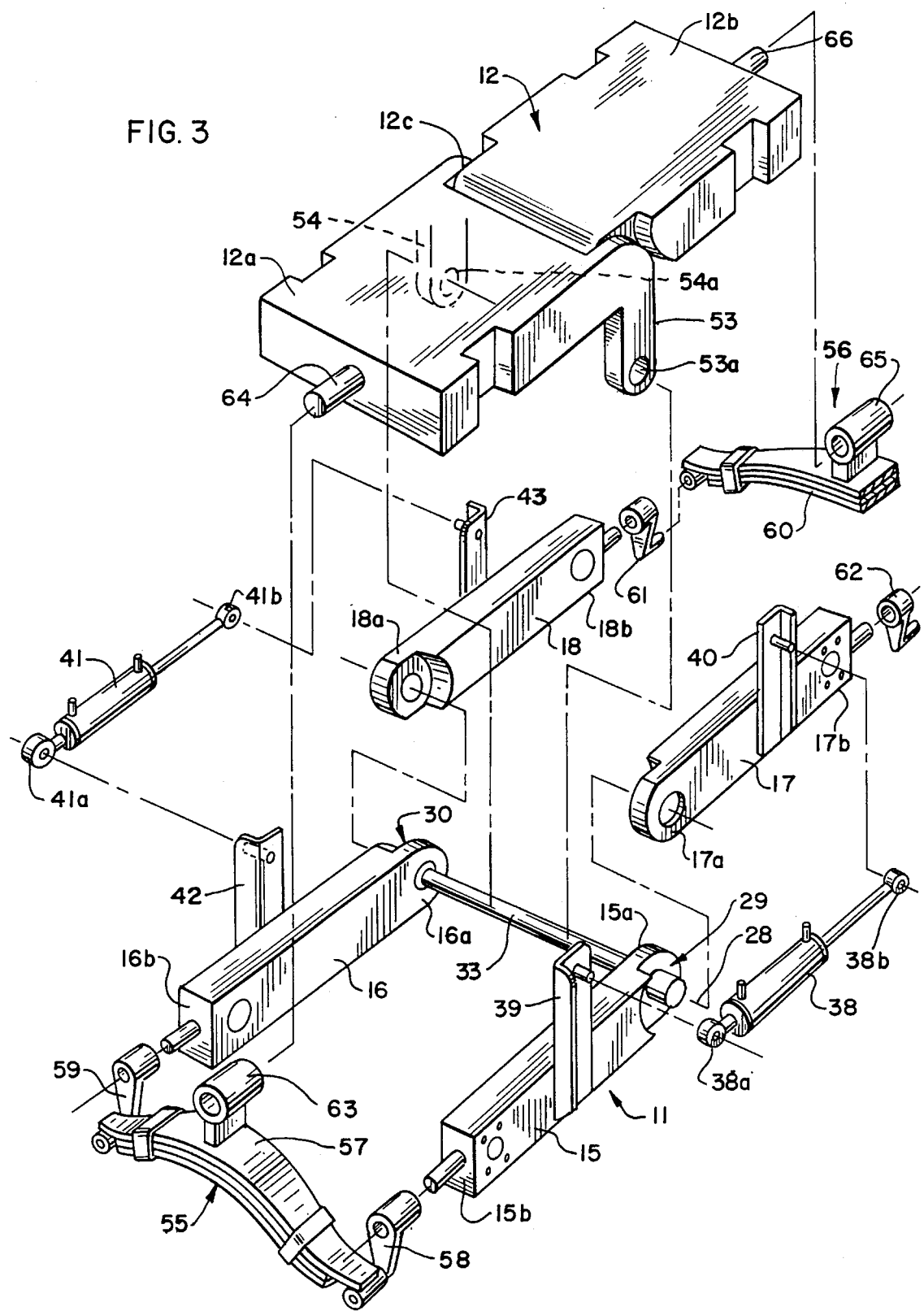
FIG. 3 is an exploded, somewhat schematic, perspective view of the vehicle frame embodying the present invention.

A transverse axis 28 extends through approximately the midpoint of the vehicle, and pivot means are provided at the transverse axis for connecting the proximal ends 15b and 17b of frame arms 15 and 17 and the proximal ends 16b and 18b of frame arms 16 and 18. The pivot means permits relative movement of frame arms 15 and 17 about a first pivot point 29 at one side of the vehicle and permits relative movement of frame arms 16 and 18 about a second pivot point 30 at an opposite side of the vehicle. Referring to FIG. 3, the pivot means may take the form of a bore 31 extending through the proximal ends of frame arms 15 and 17, a bore 32 extending through the proximal ends of frame arms 16 and 18, and a central axle 33 which extends along transverse axis 28 and through the bores 31 and 32. The central axle 33 and transverse axis 28 are coincident, and axle 33 and axis 28 are substantially maintained in a relatively horizontal plane 34 with respect to the ground G (FIG. 4) by the frame 11 as described in detail below.

Figure 1:
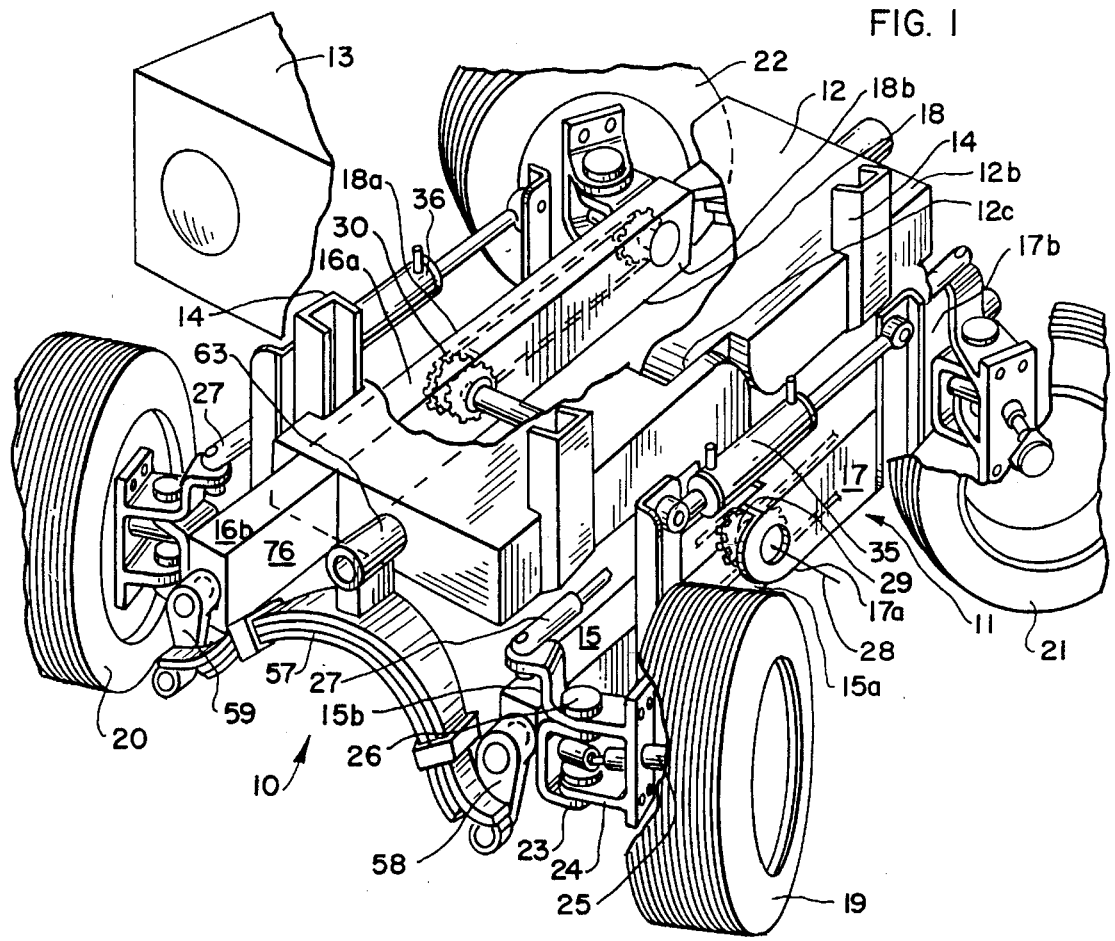
FIG. 1 is a fragmentary, somewhat schematic, perspective view of the vehicle embodying the present invention.

A first connecting means 35 is connected to the frame arms 15 and 17 and extends generally across the first pivot point 29 for controlling relative movement of frame arms 15 and 17 about central axle 33. A second connecting means 36 is connected to third and fourth frame arms 16 and 18 and extends generally across the second pivot point 30 for controlling relative movement of frame arms 16 and 18 about central axle 33. In the embodiment shown in FIGS. 1–3, first connecting means 35 includes a length-adjustable member 38 having first and second ends 38a and 38b respectively attached to brackets 39 and 40 which are welded or otherwise secured to frame arms 15 and 17. Second connecting means 36 includes a length-adjustable member 41 having first and second ends 41a and 41b respectively connected to brackets 42 and 43 which are welded or otherwise secured to frame arms 16 and 18.

Figure 2:
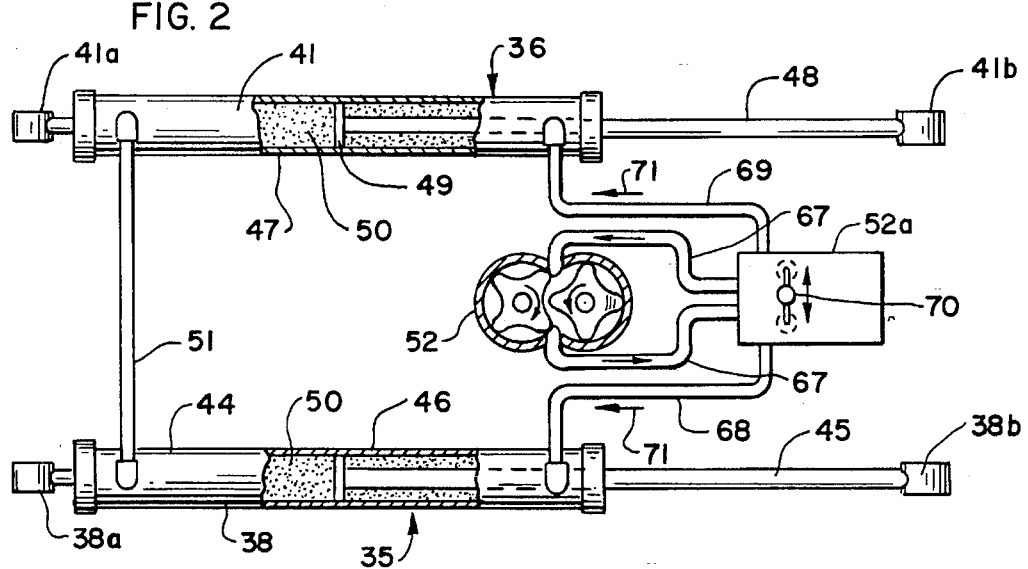
FIG. 2 is a fragmentary, somewhat schematic, top plan view of the hydraulic control system of the present invention.

Referring to FIG. 2, length-adjustable member 38 includes a hydraulic cylinder 44 and a piston rod 45 and head 46 which are slidably received within hydraulic cylinder 44. Similarly, length-adjustable member 41 includes a hydraulic cylinder 47 and a piston rod 48 and head 49 which are slidably received within hydraulic cylinder 47. The length-adjustable members 38 and 41 extend generally across the pivot points 29 and 30 and set up a linkage system which controls relative movement of frame arms 15 and 17 and frame arms 16 and 18 about the pivot points 29 and 30, respectively. It will also be understood that the connecting means may take the form of other suitable length-adjustable members such as worm screws or the like which are commonly used in CMC machines.

Figure 5:
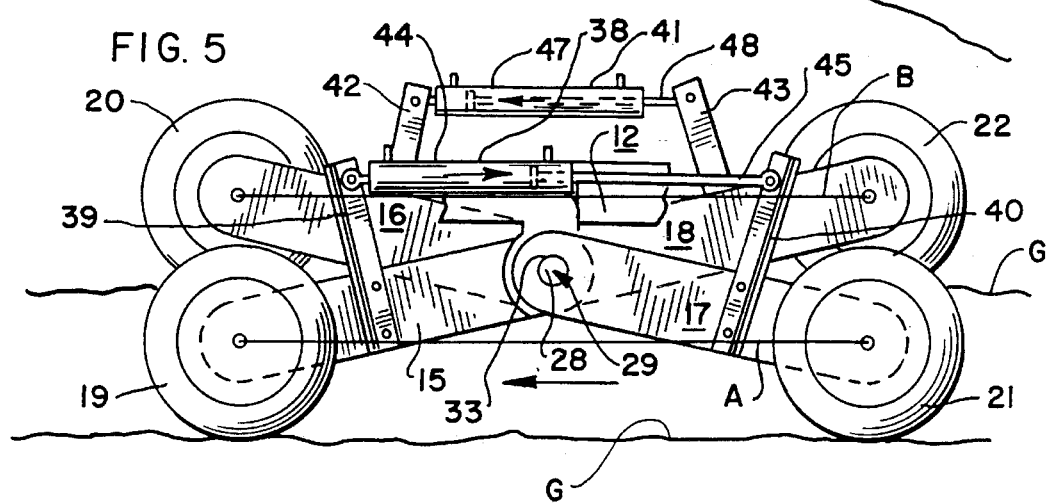
FIG. 5 is a fragmentary, somewhat schematic, side elevational view of the vehicle frame travelling along a slanted grade as shown in FIG. 4.

Referring to FIG. 5, extension of the piston rod 45 in the hydraulic cylinder 44 causes the frame arms 15 and 17 to rotate downwardly about pivot point 29, and pivot point 29 is raised above a wheelbase line A which extends between wheels 19 and 21 on frame arms 15 and 17. Such movement shortens the length of the wheelbase line A between wheels 19 and 21, and the wheels remain in full contact with the ground surface G. Retraction of the piston rod 48 within the hydraulic cylinder 47 causes the frame arms 16 and 18 to pivot upwardly about pivot point 30, and pivot point 30 is lowered below a wheelbase line B which extends between wheels 20 and 22 on frame arm 16 and 18. Such movement shortens the length of the wheelbase line B between wheels 20 and 22, and the wheels remain in full contact with the ground surface G. The length-adjustable members 38 and 41 are both extendable and retractable in the manner described to selectively adjust the vertical positioning of the pivot points 29 and 30 on each side of the vehicle with respect to the horizontal plane 34 (FIG. 4).

Control means are operatively associated with the first and second connecting means 35 and 36 for adjusting the relative positions of the frame arms about the first and second pivot points so that the central axle 33 and transverse axis 28 are substantially maintained in a relatively horizontal plane. The control means adjusts the length of the length-adjustable members 38 and 41 so that an extension or retraction of one of the length-adjustable members respectively causes a retraction or extension of the other length-adjustable member. In the embodiment given in the illustrations, the control means take the form of hydraulic fluid 50, a slave drive 51 in the form of flexible hydraulic hose, and a hydraulic pump 52. The hydraulic fluid 50 fills the cylinders 44 and 47, and the slave drive or hydraulic hose 51 allows the hydraulic fluid 50 to flow freely between the hydraulic cylinders 44 and 47. When one of the piston heads 46 or 49 moves within the corresponding cylinder 44 or 47, the one piston forces or draws hydraulic fluid 50 through the slave drive 51 which causes a corresponding adjustment in the position of the other piston head.

The hydraulic pump 52 is operable to selectively increase the pressure of the hydraulic fluid 50 in cylinders 44 and 47. The pump 52 provides sufficient hydraulic pressure in the cylinders to overcome the weight of the vehicle and other forces while causing a desired adjustment in length of one or both of the length-adjustable members 38 and 41. A console 52a is connected to pump 52 to control operation of the pump 52, and console 52a may be operated by the driver or may include means for automatically controlling pump 52 as described in more detail hereinbelow.

Referring to FIG. 3, platform 12 is connected to the central axle 33 by downwardly-extending support members 53 and 54, and the front and back halves 12a and 12b are pivotal about a pivotal connection 12c to accommodate for vertical shifts in the longitudinal direction. The support members 53 and 54 include bores 53a and 54a which receive the axle 33, and platform 12 is free to move on support members 53 and 54 relative to vehicle frame 11. Such attachment of the platform 12 to the central axle 33 results in the platform 12 adopting the same transverse orientation as the central axle 33 which extends through approximately the midpoint of frame 11. When the central axle 33 is maintained in a relatively level or horizontal plane, the platform 12 and the vehicle body 13 also adopt a transversely level or horizontal orientation.

Front and rear connecting arm assemblies 55 and 56 extend between the forward and rearward distal ends of the frame arms, respectively. The connecting arm assemblies 55 and 56 permit the distances between the distal ends of the frame arms to vary as the frame arms rotate relative to each other about the first and second pivot points 29 and 30. The connecting arm assemblies 55 and 56 may take the form of the construction described in my prior co-invented U.S. Pat. No. 3,917,306, which is hereby incorporated by reference. Briefly, the front connecting arm assembly 55 includes a frame member 57 and a pair of links 58 and 59, each of the links being pivotally connected at one end to frame member 57 and at the other end to the respective distal end of frame arm 15 or 16. The rear connecting arm assembly 56 also includes a frame member 60 and a pair of links 61 and 62, each of the links being connected at one end to frame member 60 and at the other end to the respective distal end of frame arm 17 or 18.

Attaching means are provided between frame members 57 and 60 and platform 12 for permitting relative movement therebetween. In the embodiment given in the drawings, the forward attaching means includes a sleeve 63 welded or otherwise connected to frame member 57 and a pivot pin 64 mounted on platform 11. Similarly, the rearward attachment means 60 includes a sleeve 65 welded or otherwise attached to frame member 60 and a pivot pin 66 mounted on platform 12. The attachment means permit the platform 12 to remain transversely level in a horizontal plane while the frame members 57 and 60 tilt to conform to the various positions of the distal ends of the frame arms 15–18.

The control means may be operated in various ways depending upon the particular application for which the vehicle is to be used. In one embodiment shown in FIG. 2, console 52a is operatively connected to pump 52 by hydraulic fluid lines 67, and an additional set of hydraulic fluid lines 68 and 69 respectively connect console 52a with hydraulic cylinders 38 and 41. Console 52a includes a lever 70 for manual operation so that an operator can selectively divert pressurized hydraulic fluid 50 to hydraulic cylinder 38 or 41 in the direction of arrows 71. For example, an operator can move lever 70 in a direction of hydraulic cylinder 41 to direct pressured hydraulic fluid 50 through line 69 in the direction of arrow 71 and into cylinder 41 for pushing piston 49 further into the cylinder, thereby causing a retraction of rod 48 into cylinder 41 as shown in FIG. 5. Such an operation would then cause hydraulic fluid 50 on the other side of piston 49 to flow through slave drive 51 into hydraulic cylinder 38 and cause a corresponding extension of rod 45 within hydraulic cylinder 38. By selectively operating lever 70 and directing pressurized hydraulic fluid 50 into lines 68 or 69, the operator can selectively raise or lower either side of the vehicle to conform to a particular terrain.

Figure 7:
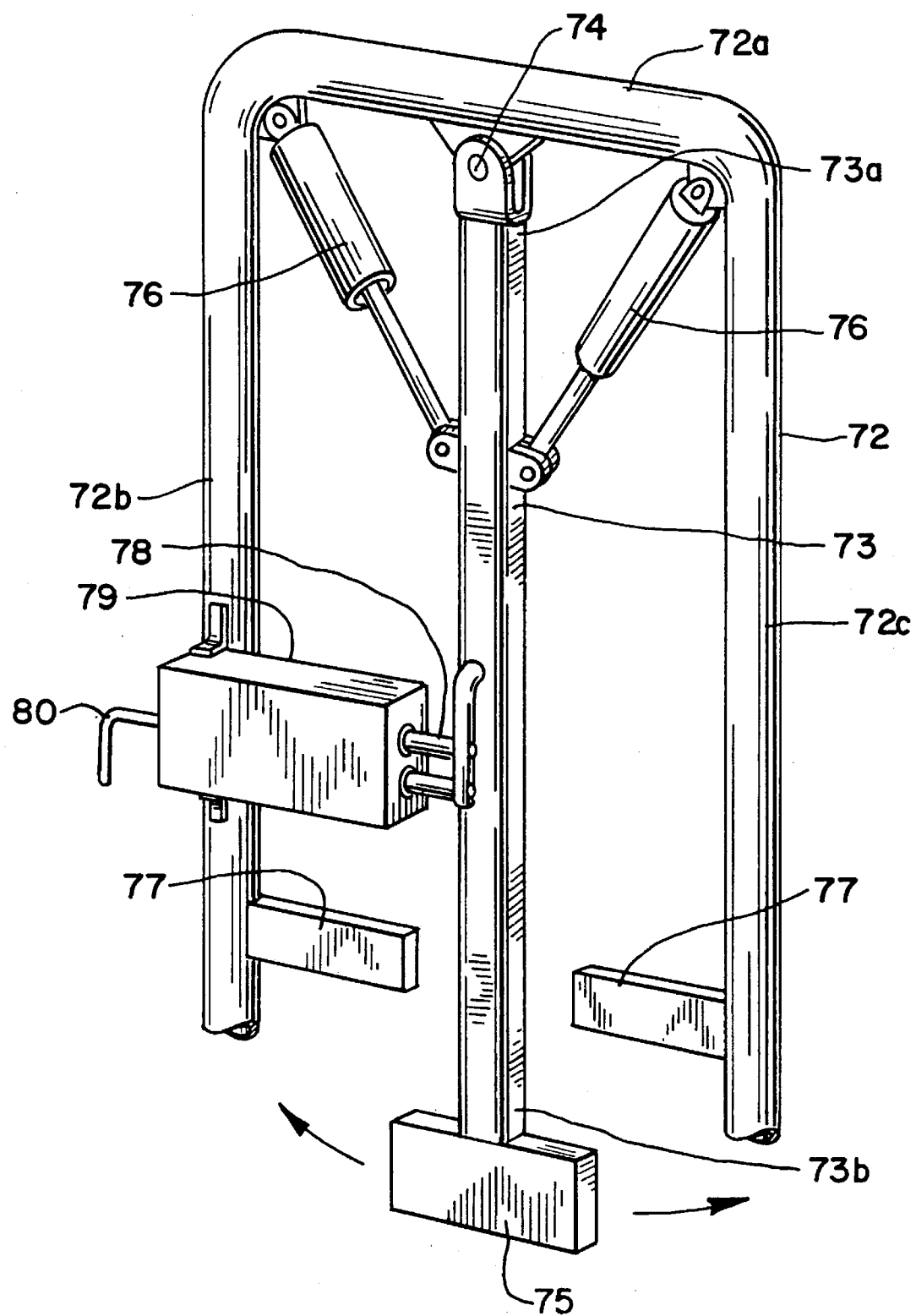
FIG. 7 is a perspective, somewhat schematic, view of an automatic leveling mechanism of this invention.

Instead of operating the control means manually, the console 52a may instead include or be connected to an automatic leveling means for automatically adjusting the relative height of the first and second pivot points 29 and 30 and leveling the vehicle. In one embodiment shown in FIGS. 4 and 7, the automatic leveling means includes a generally inverted, U-shaped pendulum support bar 72 which also serves in this embodiment as a roll bar for the vehicle 10. A pendulum 73 having proximal and distal ends 73a and 73b is connected to the top portion 72a of U-shaped support bar 72. A pivot pin 74 connects proximal end 73a of pendulum 73 to the bar 72 and allows it to pivot in the lateral direction. The distal end 73b of pendulum 73 includes a weight 75 for providing inertia to the pendulum 73 so that it does not move or change directions of movement quickly. In addition, dampening means in the form of hydraulic cylinders 76 extend from bar 72 and are connected to pendulum 73 for dampening movement of the pendulum in the lateral direction. The legs 72b and 72c of bar 72 are also provided with a pair of stops 77 for limiting lateral movement of pendulum 73.

Translation means are operatively connected to pendulum 73 for translating lateral movement of the pendulum into corresponding actions of the control means to level the vehicle. In the embodiment shown in FIG. 7, the translation means takes the form of a moveable piston structure 78 connected to piston 73 and being slidably received in a control box 79. As the transverse axis 28 of the vehicle tips in either direction, the pendulum 73 will correspondingly move and result in a movement of the piston structure 78 within control box 79. Control box 79 is operatively connected to console 52a by a line 80 and sends signals to console 52a for controlling movement of the hydraulic cylinders 38 and 41. In particular, if the pendulum tilts in one direction in response to the vehicle 10 traversing uneven ground, the piston 78, control box 79 and line 80 will send a signal to console 52a to raise that side of the vehicle and level the transverse axis 28. Other automatic leveling means may also be employed in the vehicle of the present invention, such as using a mercury switch which can detect if the vehicle is out of level and send an appropriate electrical signal to console 52a for automatically leveling the vehicle.

Operation of the vehicle frame as the vehicle traverses rough or uneven terrain will now be described in connection with FIGS. 4–6. In FIGS. 4 and 5, the vehicle 10 is shown travelling along a slanted ground surface G. When the vehicle travels along such a slanted grade, the frame arms 15 and 17 which carry the lower set of wheels 19 and 21 rotate about the pivot point 29 so that wheels 19 and 21 follow the contour of the ground. Similarly, the frame arms 16 and 18 which carry the upper set of wheels 20 and 22 rotate about the pivot point 30 so that the wheels 20 and 22 follow the contour of the ground. However, the first and second connecting means 35 and 36 and the control means control relative movement of the frame arms about the pivot points 29 and 30 so that the central axle 33 (or transverse axis 28) remains relatively level in horizontal plane 34. The vehicle platform 12 and body 13, which holds the driver, are supported by the platform on the level or horizontally-extending axle 33, and the driver therefore enjoys a comfortable and level driving position while the vehicle travels along the slanted grade.

Describing operation of the frame 11 in detail, the wheels 19–22 conform to the ground surface, and the length-adjustable member 38 of the lower set of wheels 19 and 21 extends while the length-adjustable member 41 of the upper set of wheels 20 and 22 retracts. The frame arms 15 and 17 pivot downwardly about the pivot point 29 so that a wheelbase line A between wheels 19 and 21 is shortened and the pivot point 29 is raised above the wheelbase line A. The frame arms 16 and 18 correspondingly pivot upwardly about the pivot point 30 so that the wheelbase line B between wheels 20 and 22 is shortened and the pivot point 30 is lowered below the wheelbase line B. Such movement substantially positions first and second pivot points 29 and 30 and axle 33 (or transverse axis 28) in the relatively horizontal plane 34 as the vehicle travels along the ground surface G.

When traveling along such a slanted grade G, the connecting means and control means cause relative movement of the frame arms about central axle 33 or transverse axis 28 so that, when one of the pivot points falls below the corresponding wheelbase line, the other pivot point is raised above the corresponding wheelbase line, whereby the central axle 33, the platform 12, and the vehicle body 13 remain relatively level. The control means may be operated manually or automatically as previously described to level the central axle 33. As shown in FIG. 4, the forward end of platform 12 also remains level as the frame member 57 tilts to correspond to the orientation of the distal ends of the frame arms 15 and 16. The same operation occurs with the rearward end of the platform 12 as described more fully in my prior co-invented U.S. Pat. No. 3,917,306.

Figure 6:
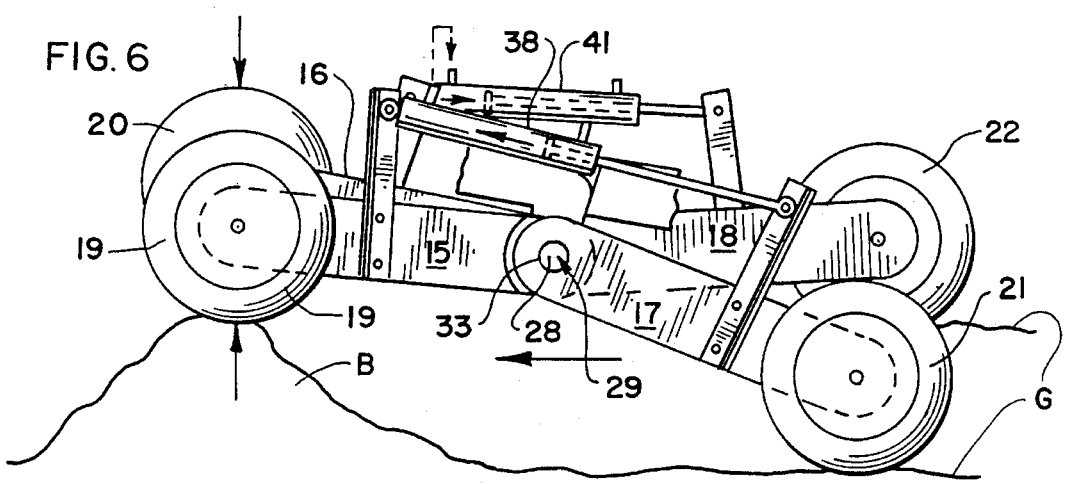
FIG. 6 is a fragmentary, somewhat schematic, side elevational view of the vehicle traversing uneven terrain.

Referring to FIG. 6, the frame 11 also adapts to irregularities or bumps that may be encountered along the ground surface. When one of the wheels encounters a bump B such as wheel 19 in FIG. 6, the corresponding frame arm 15 pivots about pivot point 29 and shortens length-adjustable member 38 while the control means causes a corresponding extension of length-adjustable member 41. The length-adjustable member 38 lowers the pivot point 29 with respect to wheelbase line A and the length-adjustable member 41 raises the pivot point 30 with respect to wheelbase line B so that the central axle 33 remains relatively level. A driver who is seated in the vehicle body 13, which is supported by platform 12 on axle 33, is therefore able to enjoy a transversely level riding position as the vehicle travels along a slanted grade or uneven or bumpy terrain.

While in the foregoing, embodiments of the invention have been disclosed in considerable detail for purposes of illustration, it will be understood by those skilled in the art that many of these details may be varied without departing from the spirit and scope of the invention.

I claim:

1. A frame for a rough terrain vehicle comprising:

first and second forwardly-extending spaced-apart frame arms which each include proximal and distal ends, each of the distal ends of the first and second frame arms having a wheel rotatably mounted thereon;

third and fourth rearwardly-extending spaced-apart frame arms which each include proximal and distal ends, each of the distal ends of the third and fourth frame arms having a wheel rotatably mounted thereon;

pivot means for connecting the proximal ends of the first and third frame arms and the proximal ends of the second and fourth frame arms, said pivot means permitting relative movement of the first and third frame arms about a first pivot point at one side of the vehicle and permitting relative movement of the second and fourth frame arms about a second pivot point at an opposite side of the vehicle;

a transverse axis extending generally through the pivot means and first and second pivot points at approximately a mid-point of the vehicle;

first connecting means secured to and extending between the first and third frame arms for controlling relative movement of the first and third frame arms about the first pivot point;

second connecting means secured to and extending between the second and fourth frame arms for controlling relative movement of the second and fourth frame arms about the second pivot point;

control means operatively associated with the first and second connecting means for adjusting the relative position of the frame arms about the first and second pivot points so that the transverse axis of the vehicle is substantially maintained in a relatively horizontal plane as the wheels travel over a ground surface.

2. The frame of claim 1 in which the first connecting means comprises a first length-adjustable member having a first end secured to a bracket on the first frame arm and a second end secured to a bracket on the third frame arm, the second connecting means comprises a second length-adjustable member having a first end connected to a bracket on the second frame arm and a second end connected to a bracket on the fourth frame arm, each of the first and second length-adjustable members including a hydraulic cylinder and a piston rod which is extendably mounted in the hydraulic cylinder.

3. The frame of claim 2 in which the control means include hydraulic fluid which fills the hydraulic cylinders and a slave drive which connects and permits the hydraulic fluid to flow between the hydraulic cylinders of the first and second length-adjustable members, whereby an extension or retraction of one of the length-adjustable members causes hydraulic fluid to flow through the slave drive so that a corresponding retraction or extension of the other of the length-adjustable members occurs.

4. The frame of claim 3 in which the extension of the first length-adjustable member causes the first and third frame arms to pivot downwardly about the first pivot point so that the first pivot point is raised above a wheelbase line which extends between the wheels mounted on the first and third frame arms and the corresponding retraction of the second length-adjustable member causes the second and fourth frame arms to pivot upwardly about the second pivot points so that the second pivot point is lowered below a wheelbase line which extends between the wheels mounted on the second and fourth frame arms, whereby the first and second pivot points are substantially positioned along a horizontally-extending axis.

5. The frame of claim 2 in which the control means include pump means in communication with hydraulic fluid in the hydraulic cylinders for controlling a hydraulic pressure of the hydraulic fluid contained in the first and second length-adjustable members.

6. The frame of claim 1 in which automatic leveling means are operatively associated with said control means for detecting when said transverse axis of said vehicle is unlevel and automatically adjusting said first and second connecting means to level said transverse axis.

7. The frame of claim 6 in which said automatic leveling means comprises a pendulum support member, an elongate pendulum having a proximal end pivotally connected to said pendulum support member and an opposite distal end having a weight connected thereto, and translation means are operatively connected to said pendulum for translating relative movement of said pendulum into corresponding actions of said control means for controlling the first and second connecting means and leveling said vehicle.

8. The frame of claim 7 in which dampening means are connected to said pendulum support member and said pendulum for dampening lateral movement of said pendulum.

9. The frame of claim 7 in which said pendulum support member includes a pair of stops for limiting lateral movement of said pendulum.

10. The frame of claim 1 in which a first wheelbase line extends between the wheels mounted on the first and third frame arms and a second wheelbase line extends between the wheels mounted on of the second and fourth frame arms, and the control means is operable to position one of the first and second pivot points above or below a corresponding one of the wheelbase lines whenever the other of the first and second pivot points is correspondingly positioned below or above the other corresponding wheelbase line.

11. The frame of claim 1 in which the pivot means includes a first bore which extends through the proximal ends of the first and third frame arms, a second bore which extends through the proximal ends of the second and fourth frame arms, and a central axle which extends through the bores along the transverse axis of the vehicle.

12. The frame of claim 11 in which a vehicle platform is connected to and supported by the central axle.

13. The frame of claim 12 in which the vehicle platform includes downwardly-extending support brackets which each include a bore, and the central axle extends through the bores of the support brackets on the vehicle platform.

14. The frame of claim 13 in which forward connecting means are secured to and extend generally transversely between the distal ends of the first and second frame arms and rearward connecting means are secured to and extend generally transversely between the distal ends of the third and fourth frame arms, and attaching means connect the forward and rearward connecting means to front and rear ends of vehicle platform and permit a distance between the distal ends of the frame arms to vary as the frame arms rotate about the pivot means while allowing the vehicle platform to remain relatively level.

15. A frame for a rough terrain vehicle comprising:

first and second forwardly extending spaced-apart frame arms which each include proximal and distal ends, each of the distal ends of the first and second frame arms having a wheel rotatably mounted thereon;

third and fourth rearwardly extending spaced-apart frame arms which each include proximal and distal ends, each of the distal ends of the third and fourth frame arms having a wheel rotatably mounted thereon;

a central axle provided at approximately the mid-point of the vehicle and extending through the proximal ends of said first and third frame arms and the proximal ends of said second and fourth frame arms, said central axle permitting relative movement of the first and third frame arms about a first pivot point at one side of the vehicle and permitting relative movement of the second and fourth frame arms about a second pivot point at an opposite side of the vehicle;

a first length-adjustable member connected to and extending between the first and third frame arms and generally across the first pivot point;

a second length-adjustable member connected to and extending between the second and fourth frame arms and generally across the second pivot point;

control means operatively associated with the first and second length-adjustable members for causing an extension or retraction of one of the length-adjustable members in response to a corresponding retraction or extension of the other of the length-adjustable members, whereby the length-adjustable members adjust the relative positions of the frame arms about the first and second pivot points so that the central axle is substantially maintained in a relatively horizontal plane as the wheels travel over a ground surface.

16. The frame of claim 15 in which the first length-adjustable member has a first end secured to a bracket on the first frame arm and a second end secured to a bracket on the third frame arm, the second length-adjustable member has a first end connected to a bracket on the second frame arm and a second end connected to a bracket on the fourth frame arm, and each of the first and second length-adjustable members includes a hydraulic cylinder and a piston rod which is extendably mounted in the hydraulic cylinder.

17. The frame of claim 16 in which the control means include hydraulic fluid which fills the hydraulic cylinders and a slave drive which connects and permits the hydraulic fluid to flow between the hydraulic cylinders of the first and second length-adjustable members, whereby an extension or retraction of one of the length-adjustable members causes hydraulic fluid to flow through the slave drive so that a corresponding retraction or extension of the other of the length-adjustable members occurs.

18. The frame of claim 17 in which the extension of the first length-adjustable member causes the first and third frame arms to pivot downwardly about the first pivot point so that the first pivot point is raised above a wheelbase line which extends between the wheels mounted on the first and third frame arms and the corresponding retraction of the second length-adjustable member causes the second and fourth frame arms to pivot upwardly about the second pivot means so that the second pivot points is lowered below a wheelbase line which extends between the wheels mounted on the second and fourth frame arms, whereby the first and second pivot points are positioned along a horizontally-extending axis.

19. The frame of claim 16 in which the control means includes pump means in communication with hydraulic fluid in the hydraulic cylinders for controlling a hydraulic pressure of the hydraulic fluid contained in the first and second length-adjustable members.

20. The frame of claim 15 in which automatic leveling means are operatively associated with said control means for detecting when said transverse axis of said vehicle is unlevel and automatically adjusting said first and second connecting means to level said transverse axis.

21. The frame of claim 20 in which said automatic leveling means comprises a pendulum support member, an elongate pendulum having a proximal end pivotally connected to said pendulum support member and an opposite distal end having a weight connected thereto, and translation means are operatively connected to said pendulum for translating relative movement of said pendulum into corresponding actions of said control means for controlling the first and second connecting means and leveling said vehicle.

22. The frame of claim 21 in which dampening means are connected to said pendulum support member and said pendulum for dampening lateral movement of said pendulum.

23. The frame of claim 21 in which said pendulum support member includes a pair of stops for limiting lateral movement of said pendulum.

24. The frame of claim 15 in which a first wheelbase line extends between the wheels mounted on the first and third frame arms and a second wheelbase line extends between the wheels mounted on the second and fourth frame arms, and the control means is operable to position one of the first and second pivot points above or below a corresponding one of the wheelbase lines whenever the other of the first and second pivot points is correspondingly lowered or raised below or above the other corresponding wheelbase line.

25. The frame of claim 15 in which the pivot means includes a bore which extends through the proximal ends of the first and third frame arms, a bore which extends through the proximal ends of the second and fourth frame arms, and the central axle extends through the bores along a transverse axis of the vehicle.

26. The frame of claim 15 in which a vehicle platform is connected to and supported by the central axle.

27. The frame of claim 26 in which the vehicle platform includes downwardly-extending support brackets which each include a bore, and the central axle extends through the bores of the support brackets on the vehicle platform.

28. The frame of claim 27 in which forward connecting means are secured to and extend generally transversely between the distal ends of the first and second frame arms and rearward connecting means are secured to and extend generally transversely between the distal ends of the third and fourth frame arms, and attaching means connect the forward and rearward connecting means to front and rear ends of vehicle platform and permit a distance between the distal ends of the frame arms to vary as the frame arms rotate about the pivot means while allowing the vehicle platform to remain relatively level.

* * * * *